United States Patent
Wang et al.

(10) Patent No.: US 11,610,389 B2
(45) Date of Patent: Mar. 21, 2023

(54) METHOD AND APPARATUS FOR POSITIONING KEY POINT, DEVICE, AND STORAGE MEDIUM

(71) Applicant: BEIJING BAIDU NETCOM SCIENCE AND TECHNOLOGY CO., LTD., Beijing (CN)

(72) Inventors: Jian Wang, Beijing (CN); Zipeng Lu, Beijing (CN); Hao Sun, Beijing (CN); Hongwu Zhang, Beijing (CN); Shilei Wen, Beijing (CN); Errui Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 68 days.

(21) Appl. No.: 17/201,665

(22) Filed: Mar. 15, 2021

(65) Prior Publication Data
US 2021/0390731 A1  Dec. 16, 2021

(30) Foreign Application Priority Data

Jun. 12, 2020 (CN) .......................... 202010538339.2

(51) Int. Cl.
*G06T 7/73* (2017.01)
*G06V 10/46* (2022.01)
(Continued)

(52) U.S. Cl.
CPC .......... *G06V 10/462* (2022.01); *G06F 18/213* (2023.01); *G06N 3/04* (2013.01);
(Continued)

(58) Field of Classification Search
CPC ............. G06T 7/73; G06T 2207/20084; G06T 2207/30196; G06T 7/70; G06K 9/6232;
(Continued)

(56) References Cited

U.S. PATENT DOCUMENTS 10,095,957 B2 * 10/2018 Kulkarni ................. G06V 10/44
10,636,165 B2 *  4/2020 Moteki ................... G06T 7/174
(Continued)

FOREIGN PATENT DOCUMENTS

CN          105447490 A       3/2016
CN          108229445 A       6/2018
(Continued)

OTHER PUBLICATIONS

European Patent Application 21162696.5 extended European search report dated Jul. 26, 2021, 3 pages.
(Continued)

*Primary Examiner* — Jerome Grant, II
(74) *Attorney, Agent, or Firm* — Lathrop GPM LLP

(57) ABSTRACT

A method and apparatus for positioning a key point, a device, and a storage medium are provided. The method may include: extracting a first feature map and a second feature map of a to-be-positioned image, the first feature map and the second feature map being different feature maps; determining, based on the first feature map, an initial position of a key point in the to-be-positioned image; determining, based on the second feature map, an offset of the key point; and adding the initial position of the key point with the offset of the key point to obtain a final position of the key point.

12 Claims, 4 Drawing Sheets

(51) Int. Cl.
*G06N 3/04* (2023.01)
*G06F 18/213* (2023.01)
*G06V 10/764* (2022.01)
*G06V 10/82* (2022.01)
*G06V 40/20* (2022.01)

(52) U.S. Cl.
CPC .............. *G06T 7/73* (2017.01); *G06V 10/764* (2022.01); *G06V 10/82* (2022.01); *G06T 2207/20084* (2013.01); *G06T 2207/30196* (2013.01); *G06V 40/20* (2022.01)

(58) Field of Classification Search
CPC ...... G06N 3/04; G06N 3/0454; G06V 10/462; G06V 40/20; G06V 10/764; G06V 10/82; G06V 40/23; G06V 10/25; G06V 10/464
USPC ........................................................ 382/103
See application file for complete search history.

(56) References Cited

U.S. PATENT DOCUMENTS 10,872,435 B2 * 12/2020 Viswanathan ..... G01C 21/3602
11,019,364 B2 * 5/2021 Liu ........................... G06N 3/04

2016/0155235 A1 6/2016 Miyatani et al.
2018/0260678 A1 9/2018 Edwards et al.
2020/0126251 A1 4/2020 Viswanathan
2020/0250462 A1 8/2020 Yang et al.

FOREIGN PATENT DOCUMENTS

| CN | 109190636 A | | 1/2019 | |
|---|---|---|---|---|
| CN | 110147776 A | | 8/2019 | |
| CN | 110930454 A | | 3/2020 | |
| CN | 111104925 A | | 5/2020 | |
| CN | 111191622 A | | 5/2020 | |
| CN | 114648747 | * | 6/2022 | |
| CN | 114898190 | * | 8/2022 | |
| EP | 3493106 A1 | | 6/2019 | |
| KR | 10-2021-0035787 | * | 4/2021 | ............... G06T 7/70 |
| WO | WO 2020/098225 A1 | | 5/2020 | |
| WO | WO2021142904 | * | 7/2021 | ............... G06K 9/00 |

OTHER PUBLICATIONS

European Patent Application 21162696.5 Communication pursuant to Article 94(3) EPC dated Jun. 2, 2022, 5 pages.

* cited by examiner

METHOD AND APPARATUS FOR POSITIONING KEY POINT, DEVICE, AND STORAGE MEDIUM

CROSS-REFERENCE TO RELATED APPLICATIONS

This application claims priority to Chinese Application No. 202010538339.2, filed on Jun. 12, 2020 and entitled "Method and Apparatus for Positioning Key Point, Device and Storage Medium," the content of which is hereby incorporated by reference in its entirety.

TECHNICAL FIELD

Embodiments of the present disclosure relate to the field of computer technology, specifically to the technical fields of artificial intelligence, deep learning and image processing, and more specifically to a method and apparatus for positioning a key point, a device, and a storage medium.

BACKGROUND

Human key point positioning refers to detecting and positioning coordinate positions of key parts, such as the head, five sense organs, the neck, and limbs, of the human body from an image. This technology is widely used in the analysis of human posture, motion track, motion angle, and the like, and can assist athletes in physical training, analyze the effect of fitness exercise, and improve teaching efficiency.

At present, the main implementation solution of human key point positioning is to use a deep neural network as a feature map extractor, then generate a heat map of key points based on the feature map, and finally position the key points directly according to the heat map.

SUMMARY

Embodiments of the present disclosure provide a method and apparatus for positioning a key point, a device, and a storage medium.

In a first aspect, an embodiment of the present disclosure provides a method for positioning a key point, the method including: extracting a first feature map and a second feature map of a to-be-positioned image, the first feature map and the second feature map being different feature maps; determining, based on the first feature map, an initial position of a key point in the to-be-positioned image; determining, based on the second feature map, an offset of the key point; and adding the initial position of the key point with the offset of the key point to obtain a final position of the key point.

In a second aspect, an embodiment of the present disclosure provides an apparatus for positioning a key point, the apparatus including: a feature map extraction module, configured to extract a first feature map and a second feature map of a to-be-positioned image, the first feature map and the second feature map being different feature maps; an initial position determination module, configured to determine, based on the first feature map, an initial position of a key point in the to-be-positioned image; an offset determination module, configured to determine, based on the second feature map, an offset of the key point; and a final position generation module, configured to add the initial position of the key point with the offset of the key point to obtain a final position of the key point.

In a third aspect, an embodiment of the present disclosure provides an electronic device, the device electronic including: at least one processor; and a memory communicatively connected with the at least one processor, the memory storing instructions executable by the at least one processor, and the instructions, when executed by the at least one processor, causing the at least one processor to perform the method according to any embodiment of the first aspect.

In a fourth aspect, an embodiment of the present disclosure provides a non-transitory computer readable storage medium storing computer instructions, the computer instructions being used to cause a computer to implement the method according to any embodiment of the first aspect.

It should be understood that the content described in this section is neither intended to identify key or important features of embodiments of the present disclosure, nor intended to limit the scope of the present disclosure. Other features of the present disclosure will become understandable through the following description.

BRIEF DESCRIPTION OF THE DRAWINGS

After reading detailed descriptions of non-limiting embodiments with reference to the following accompanying drawings, other features, objectives and advantages of the present disclosure will become more apparent. The drawings are used to better understand the solution and do not constitute limitations to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

In the method and apparatus for positioning a key point, the device, and the storage medium according to embodiments of the present disclosure, a first feature map and a second feature map of a to-be-positioned image are first extracted; then, an initial position of a key point in the to-be-positioned image is determined based on the first feature map, and an offset of the key point is determined based on the second feature map; and finally, the initial position of the key point is added with the offset of the key point to obtain a final position of the key point. Rough positioning and accurate positioning are performed on the key point by using different feature maps respectively, thereby improving the abilities of the feature maps to learn different types of features concerned by the rough positioning and the accurate positioning, and ultimately improving the accuracy of key point positioning. The technical problem of errors in key point positioning directly based on a heat map is solved. This solution can be applied to an AI technology open platform, and is superior to the existing open source solutions.

Figure 1:
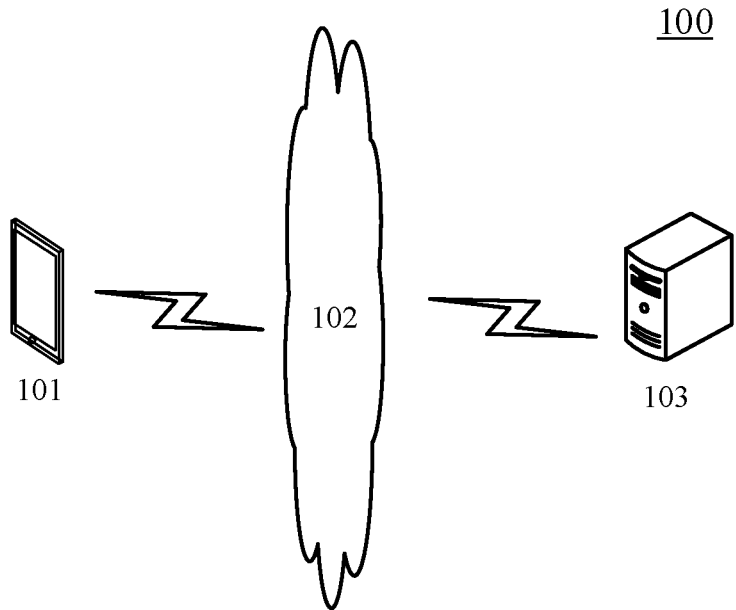
FIG. 1 is an example system architecture in which embodiments of the present disclosure may be implemented.

FIG. 1 shows an example system architecture 100 in which a method for positioning a key point or an apparatus for positioning a key point according to embodiments of the present disclosure may be implemented.

As shown in FIG. 1, the system architecture 100 may include a terminal device 101, a network 102, and a server 103. The network 102 serves as a medium providing a communication link between the terminal device 101 and the server 103. The network 102 may include various types of connections, such as wired or wireless communication links, or optical fiber cables.

A user may interact with the server 103 by using the terminal device 101 through the network 102 to receive or send messages. The terminal device 101 may be installed with various client applications, such as image processing applications.

The terminal device 101 may be hardware or software. When the terminal device 101 is hardware, the terminal device 101 may be various electronic devices with cameras, including but not limited to a surveillance camera, an intelligent device, and the like. When the terminal device 101 is software, the terminal device 101 may be installed in the electronic device. The terminal device 101 may be implemented as a plurality of software programs or software modules, or as a single software program or software module. Specific limitations are not provided here.

The server 103 may be a server providing various services, such as a backend server of an image processing application. The backend server of the image processing application may process, such as analyze, data such as a to-be-positioned image acquired from the terminal device 101, and feed back a processing result (for example, a final position of a key point) to the terminal device 101.

It should be noted that the server 103 may be hardware or software. When the server 103 is hardware, the server 103 may be implemented as a distributed server cluster composed of a plurality of servers, or as a single server. When the server 103 is software, the server 103 may be implemented as a plurality of software programs or software modules (for example, used to provide distributed services), or as a single software program or software module. Specific limitations are not provided here.

It should be noted that the method for positioning a key point according to embodiments of the present disclosure is generally executed by the server 103, and accordingly, the apparatus for positioning a key point is generally provided in the server 103.

It should be understood that numbers of the terminal device, the network, and the server in FIG. 1 are merely illustrative. Any number of terminal devices, networks and servers may be configured according to actual requirements. In the case where a to-be-positioned image is stored in the server 103, the system architecture 100 may not include the terminal device 101 and the network 102. In addition, when the terminal device 101 has processing capabilities, the method for positioning a key point according to embodiments of the present disclosure may also be executed by the terminal device 101, and accordingly, the apparatus for positioning a key point may also be provided in the terminal device 101. In this case, the system architecture 100 may not include the network 102 and the server 103.

Figure 2:
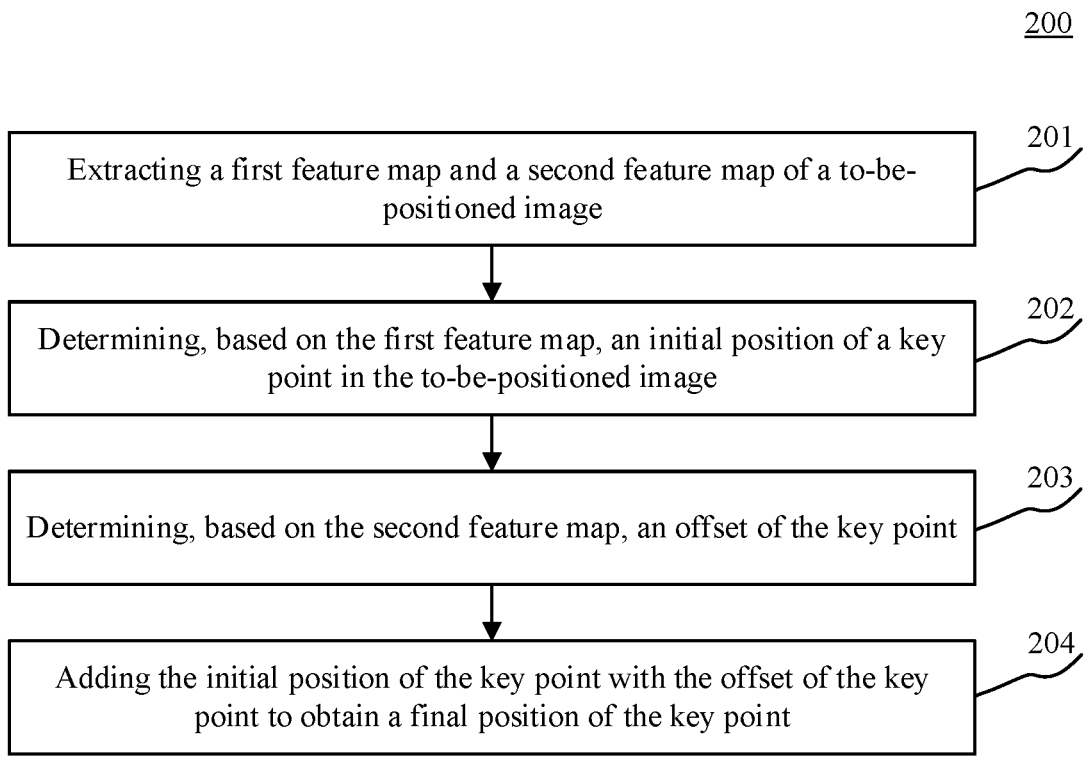
FIG. 2 is a flowchart of a method for positioning a key point according to an embodiment of the present disclosure.

Continuing to referring to FIG. 2, a flow 200 of a method for positioning a key point according to an embodiment of the present disclosure is shown. The method for positioning a key point includes the following steps.

Step 201: extracting a first feature map and a second feature map of a to-be-positioned image.

In this embodiment, the executing body (for example, the server 103 shown in FIG. 1) of the method for positioning a key point may acquire the to-be-positioned image, and extract the first feature map and the second feature map of the to-be-positioned image.

Generally, the executing body may acquire the to-be-positioned image from a terminal device (for example, the terminal device 101 shown in FIG. 1). The terminal device may be various electronic devices that support image acquisition functions, including but not limited to a surveillance camera, an intelligent device, and the like. The method for positioning a key point enables the terminal device to obtain more accurate key point positioning capabilities, thereby further assisting downstream application analysis, such as motion recognition, human local attributes and apparent feature analysis. In addition, when the to-be-positioned image is stored locally, the executing body may acquire the locally stored to-be-positioned image.

In practice, the first feature map and the second feature map may be different feature maps. For example, the two feature maps are respectively extracted by using two independent deep neural networks. As another example, the two feature maps are respectively extracted by using two different convolutional layers of a deep neural network. As still another example, the two feature maps are respectively extracted by using two independent branches of a deep neural network.

Step 202: determining, based on the first feature map, an initial position of a key point in the to-be-positioned image.

In this embodiment, the executing body may perform rough positioning based on the first feature map to obtain a rough position of the key point. For example, a feature in the first feature map is analyzed to determine the initial position of the key point in the to-be-positioned image. Specifically, the initial position of the key point can be determined by using a large-scale global semantic feature in the first feature map. The key point may be a point on a main part of a target existing in the to-be-positioned image. The initial position of the key point may be the rough position of the key point. Taking the presence of a human body in the to-be-positioned image as an example, the corresponding key point may include, but is not limited to, points on the parts such as head, five sense organs, neck, and limbs.

Step 203: determining, based on the second feature map, an offset of the key point.

In this embodiment, the executing body may perform accurate positioning based on the second feature map to obtain the accurate offset of the key point. For example, a feature in the second feature map is analyzed to determine the offset of the key point in the to-be-positioned image.

Specifically, the offset of the key point can be determined by using a small-scale local semantic feature in the second feature map. The offset of the key point may be an offset between a final position and the initial position of the key point. The final position of the key point may be an accurate position of the key point.

Step 204: adding the initial position of the key point with the offset of the key point to obtain a final position of the key point.

In this embodiment, the executing body may add the initial position of the key point with the offset of the key point to obtain the final position of the key point.

In the method for positioning a key point according to an embodiment of the present disclosure, a first feature map and a second feature map of a to-be-positioned image are first extracted; then, an initial position of a key point in the to-be-positioned image is determined based on the first feature map, and an offset of the key point is determined based on the second feature map; and finally, the initial position of the key point is added with the offset of the key point to obtain a final position of the key point. Rough positioning and accurate positioning are performed on the key point by using different feature maps respectively, thereby improving the abilities of the feature maps to learn different types of features concerned by the rough positioning and the accurate positioning, and ultimately improving the accuracy of key point positioning. The technical problem of errors in key point positioning directly based on a heat map is solved. This solution can be applied to an AI technology open platform, and is superior to the existing open source solutions.

Figure 3:
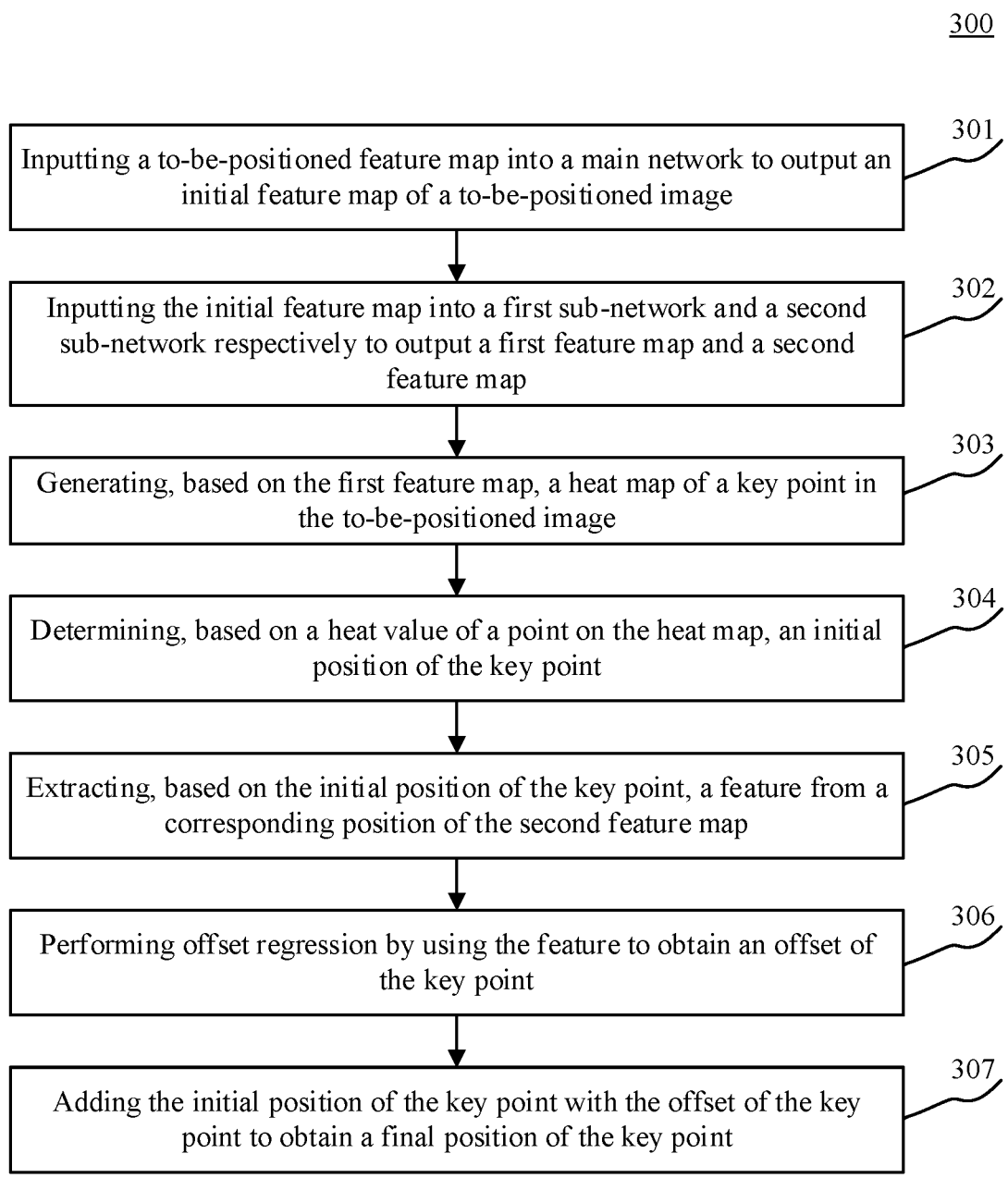
FIG. 3 is a flowchart of the method for positioning a key point according to another embodiment of the present disclosure.

Further referring to FIG. 3, a flow 300 of the method for positioning a key point according to another embodiment of the present disclosure is shown. The method for positioning a key point includes the following steps.

Step 301: inputting a to-be-positioned feature map into a main network to output an initial feature map of a to-be-positioned image.

In this embodiment, the executing body (for example, the server 103 shown in FIG. 1) of the method for positioning a key point may extract two feature maps by using two independent branches of a deep neural network respectively. Generally, the deep neural network may include a main network, and a first sub-network and a second sub-network as two different branches can be derived from the main network. First, the to-be-positioned feature map is inputted into the main network, and the main network can output the initial feature map of the to-be-positioned image. The main network may include a large number of convolutional layers.

Step 302: inputting the initial feature map into a first sub-network and a second sub-network respectively to output a first feature map and a second feature map.

In this embodiment, the executing body may input the initial feature map outputted by the main network into the first sub-network and the second sub-network respectively to output the first feature map and the second feature map.

The first sub-network and the second sub-network may be two different branches of the main network. The two branches may include a large number of convolutional layers, and may have the same structure or different structures. In the case of the same structure, parameters of the two branches are bound to be different to ensure that the two branches output two different feature maps.

Step 303: generating, based on the first feature map, a heat map of a key point in the to-be-positioned image.

In this embodiment, the executing body may generate, based on the first feature map, the heat map of the key point in the to-be-positioned image. A heat value of each point on the heat map may be used to represent a probability that the point is a key point. Generally, if the heat value is larger, the probability that the corresponding point is a key point is larger.

Step 304: determining, based on a heat value of a point on the heat map, an initial position of the key point.

In this embodiment, the executing body may determine, based on the heat value of the point on the heat map, the initial position of the key point. For example, the executing body may roughly determine a point with a heat value greater than a preset threshold as the key point, and the position of the point on the heat map is the initial position of the key point.

In some embodiments, 1×1 convolution is performed on the first feature map to obtain the heat map. The number of channels of the heat map is the same as the number of key points, and the channels of the heat map correspond to the key points one to one. The position of the point with the largest response value on a channel is the initial position of the corresponding key point.

Step 305: extracting, based on the initial position of the key point, a feature from a corresponding position of the second feature map.

In this embodiment, the executing body may find the corresponding position on the second feature map according to the initial position of the key point, and extract the feature from the corresponding position. Since the feature is only extracted from the corresponding position, a local semantic feature of the key point is obtained.

Step 306: performing offset regression by using the feature to obtain an offset of the key point.

In this embodiment, the executing body may perform offset regression by using the feature to obtain the offset of the key point.

The offset δ of the key point may be obtained by a formula δ=func (F). F is the feature extracted from the corresponding position of the second feature map based on the initial position of the key point. func is a regression network, which may include 1 to 2 fully connected layers.

Step 307: adding the initial position of the key point with the offset of the key point to obtain a final position of the key point.

In this embodiment, the specific operation of step 307 is described in detail in step 204 of the embodiment shown in FIG. 2, and details are not described herein again.

It can be seen from FIG. 3 that, compared with the embodiment corresponding to FIG. 2, the flow 300 of the method for positioning a key point in this embodiment highlights the feature map extraction step and the offset determination step. Therefore, in the solution described in this embodiment, the first feature map and the second feature map are respectively extracted by using different branches of the same deep neural network, and the extraction process involves both the same layer and independent layers, so that the two feature maps have certain association and certain differences. In addition, error regression of the position of the key point is performed by using the second feature map different from the rough positioning stage to achieve accurate positioning of the key point.

Figure 4:
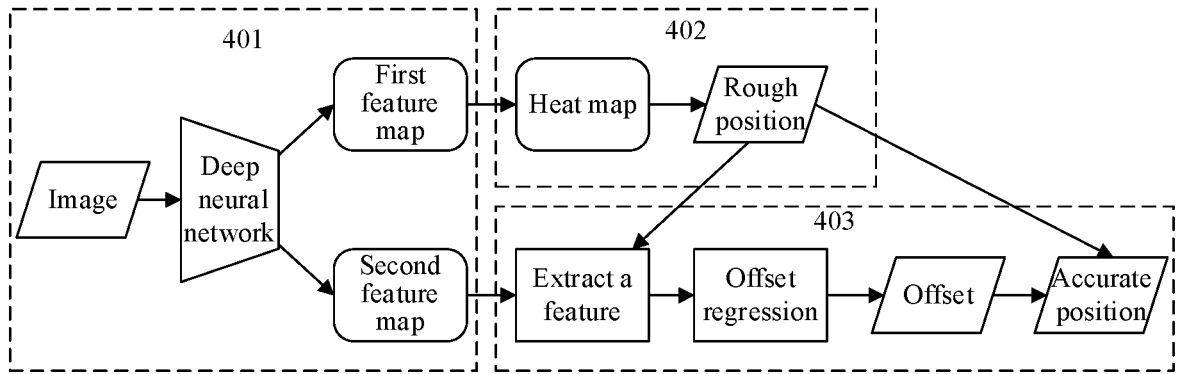
FIG. 4 is a diagram of a scenario in which the method for positioning a key point according to embodiments of the present disclosure may be implemented.

For ease of understanding, the following provides a diagram of a scenario in which the method for positioning a key point according to embodiments of the present disclosure may be implemented. As shown in FIG. 4, the scenario includes a feature map extraction stage 401, a rough positioning stage 402, and an accurate positioning stage 403. For the feature map extraction stage 401, a first feature map and a second feature map of an image are respectively extracted by using a deep neural network containing two independent branches. For the rough positioning stage 402, a heat map is generated based on the first feature map, and a rough position of a key point is determined based on a heat value of a point on the heat map. For the accurate positioning stage 403, a feature is extracted from a corresponding position of the second feature map based on the rough position, and offset regression is performed by using the feature to obtain an offset. Finally, the rough position is added with the offset to obtain an accurate position.

Figure 5:
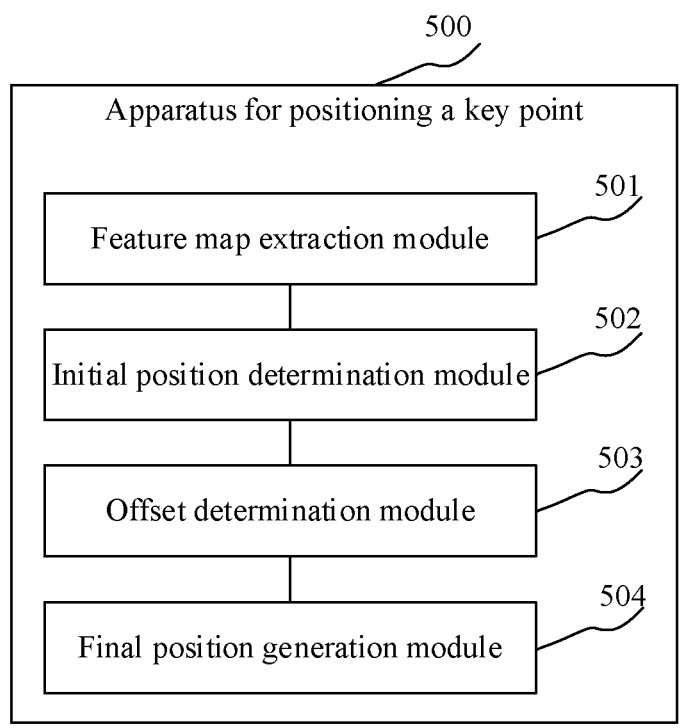
FIG. 5 is a schematic structural diagram of an apparatus for positioning a key point according to an embodiment of the present disclosure.

Further referring to FIG. 5, as an implementation of the methods shown in the above figures, an embodiment of the present disclosure provides an apparatus for positioning a key point. The embodiment of the apparatus corresponds to the embodiment of the method shown in FIG. 2, and the apparatus can be applied to various electronic devices.

As shown in FIG. 5, the apparatus 500 for positioning a key point according to this embodiment may include: a feature map extraction module 501, an initial position determination module 502, an offset determination module 503, and a final position generation module 504. The feature map extraction module 501 is configured to extract a first feature map and a second feature map of a to-be-positioned image, the first feature map and the second feature map being different feature maps; the initial position determination module 502 is configured to determine, based on the first feature map, an initial position of a key point in the to-be-positioned image; the offset determination module 503 is configured to determine, based on the second feature map, an offset of the key point; and the final position generation module 504 is configured to add the initial position of the key point with the offset of the key point to obtain a final position of the key point.

In this embodiment, in the apparatus 500 for positioning a key point: the specific processing of the feature map extraction module 501, the initial position determination module 502, the offset determination module 503, and the final position generation module 504 and the technical effects brought accordingly can be referred to the relevant descriptions of step 201-204 in the embodiment corresponding to FIG. 2, and details are not described herein again.

In some optional implementation modes of this embodiment, the feature map extraction module 501 is further configured to: input a to-be-positioned feature map into a main network to output an initial feature map of the to-be-positioned image; and input the initial feature map into a first sub-network and a second sub-network respectively to output the first feature map and the second feature map, where the first sub-network and the second sub-network are two different branches of the main network.

In some optional implementation modes of this embodiment, the initial position determination module 502 includes: a heat map generation sub-module (not shown) configured to generate, based on the first feature map, a heat map of the key point in the to-be-positioned image; and an initial position determination sub-module (not shown) configured to determine, based on a heat value of a point on the heat map, the initial position of the key point.

In some optional implementation modes of this embodiment, the heat map generation sub-module is further configured to: perform 1×1 convolution on the first feature map to obtain the heat map, where channels of the heat map correspond to key points one to one.

In some optional implementation modes of this embodiment, the offset determination module 503 is further configured to: extract, based on the initial position of the key point, a feature from a corresponding position of the second feature map; and perform offset regression by using the feature to obtain the offset of the key point.

According to embodiments of the present disclosure, the present disclosure further provide an electronic device and a readable storage medium.

Figure 6:
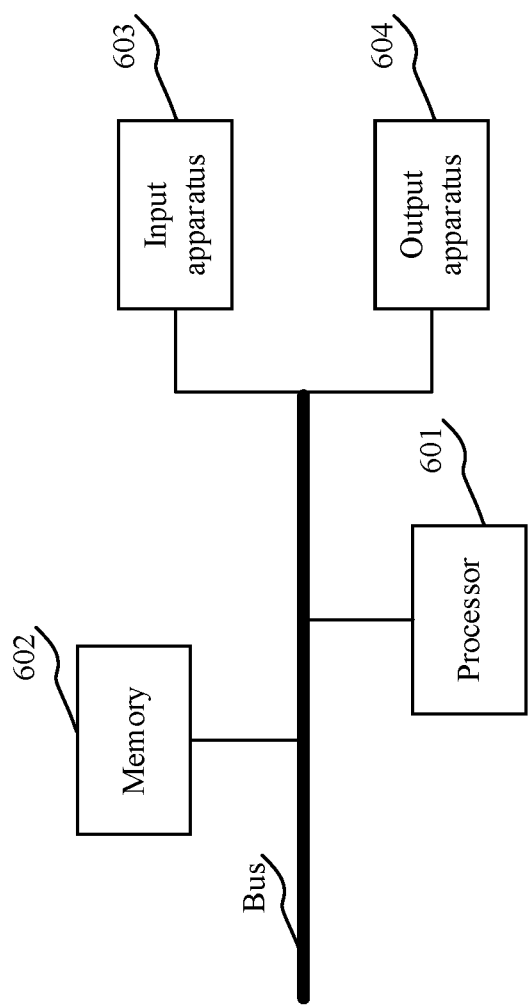
FIG. 6 is a block diagram of an electronic device used to implement the method for positioning a key point according to embodiments of the present disclosure.

FIG. 6 shows a block diagram of an electronic device for the method for positioning a key point according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital processor, a cellular phone, a smart phone, a wearable device, and other similar computing apparatuses. The components shown herein, their connections and relationships, and their functions are merely examples, and are not intended to limit the implementation of the present disclosure described and/or required herein.

As shown in FIG. 6, the electronic device includes: one or more processors 601, a memory 602, and interfaces for connecting various components, including high-speed interfaces and low-speed interfaces. The various components are connected to each other by different buses, and can be installed on a common motherboard or installed in other ways as required. The processor may process instructions executed in the electronic device, including instructions stored in or on the memory to display graphical information of a GUI on an external input/output apparatus (such as a display device coupled to an interface). In other embodiments, a plurality of processors and/or a plurality of buses may be used with a plurality of memories if necessary. Similarly, a plurality of electronic devices may be connected, and each device provides some necessary operations (for example, as a server array, a group of blade servers, or a multi-processor system). One processor 601 is taken as an example in FIG. 6.

The memory 602 is a non-transitory computer readable storage medium provided by embodiments of the present disclosure. The memory stores instructions executable by at least one processor, causing the at least one processor to execute the method for positioning a key point according to embodiments of the present disclosure. The non-transitory computer readable storage medium of embodiments of the present disclosure stores computer instructions, and the computer instructions are used for a computer to execute the method for positioning a key point according to embodiments of the present disclosure.

As a non-transitory computer readable storage medium, the memory 602 can be used to store non-transitory software programs, non-transitory computer-executable programs, and modules, such as program instructions/modules (for example, the feature map extraction module 501, the initial position determination module 502, the offset determination module 503, and the final position generation module 504 shown in FIG. 5) corresponding to the method for positioning a key point according to embodiments of the present disclosure. The processor 601 executes various functional applications and data processing of the server by running the non-transitory software programs, instructions, and modules stored in the memory 602, that is, implements the method for positioning a key point according to embodiments of the method.

The memory 602 may include a program storage area and a data storage area, where the program storage area may store an operating system and an application program required by at least one function; and the data storage area may store data created by the use of the electronic device according to the method for positioning a key point. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely configured with respect to the processor 601, and these remote memories may be connected to the electronic device for the method for positioning a key point through a network. Examples of the network include, but are not limited to, the Internet, an intranet, a local area network, a mobile communications network, or a combination thereof.

The electronic device for the method for positioning a key point may further include: an input apparatus 603 and an output apparatus 604. The processor 601, the memory 602, the input apparatus 603, and the output apparatus 604 may be connected by a bus or other means, exemplified by a bus in FIG. 6.

The input apparatus 603 may receive input digital or character information, and generate key signal inputs related to user settings and function control of the electronic device for performing the method for positioning a key point, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally remote from each other and typically interact through the communication network. The relationship between the client and the server is generated through computer programs running on the respective computers and having a client-server relationship to each other.

According to the technical solution of the embodiments of present disclosure, a first feature map and a second feature map of a to-be-positioned image are first extracted; then, an initial position of a key point in the to-be-positioned image is determined based on the first feature map, and an offset of the key point is determined based on the second feature map; and finally, the initial position of the key point is added with the offset of the key point to obtain a final position of the key point. Rough positioning and accurate positioning are performed on the key point by using different feature maps respectively, thereby improving the abilities of the feature maps to learn different types of features concerned by the rough positioning and the accurate positioning, and ultimately improving the accuracy of key point positioning. The technical problem of errors in key point positioning directly based on a heat map is solved. This solution can be applied to an AI technology open platform, and is superior to the existing open source solutions.

It should be understood that the various forms of processes shown above may be used to reorder, add or delete steps. For example, the steps described in embodiments of the present disclosure may be performed in parallel, sequentially, or in different orders, as long as the desired result of the technical solution disclosed in embodiments of the present disclosure can be achieved, no limitation is made herein.

Embodiments do not constitute a limitation to the scope of protection of the present disclosure. It should be appreciated by those skilled in the art that various modifications, combinations, sub-combinations and replacements may be made depending on design requirements and other factors. Any modification, equivalent replacement, and improvement falling within the spirit and the principle of embodiments of the present disclosure should be included within the scope of protection of the present disclosure.

What is claimed is:

1. A method for positioning a key point, comprising:
extracting a first feature map and a second feature map of a to-be-positioned image, the first feature map and the second feature map being different feature maps;
determining, based on the first feature map, an initial position of a key point in the to-be-positioned image;
determining, based on the second feature map, an offset of the key point; and
adding the initial position of the key point with the offset of the key point to obtain a final position of the key point,
wherein the extracting the first feature map and the second feature map of the to-be-positioned image comprises:
inputting a to-be-positioned feature map into a main network to output an initial feature map of the to-be-positioned image; and
inputting the initial feature map into a first sub-network and a second sub-network respectively to output the first feature map and the second feature map, wherein the first sub-network and the second sub-network are two different branches of the main network.

2. The method according to claim 1, wherein the determining, based on the first feature map, the initial position of the key point in the to-be-positioned image comprises:
generating, based on the first feature map, a heat map of the key point in the to-be-positioned image; and
determining, based on a heat value of a point on the heat map, the initial position of the key point.

3. The method according to claim 2, wherein the generating, based on the first feature map, the heat map of the key point in the to-be-positioned image comprises:
performing 1×1 convolution on the first feature map to obtain the heat map, wherein channels of the heat map correspond to key points one to one.

4. The method according to claim 1, wherein the determining, based on the second feature map, the offset of the key point comprises:
extracting, based on the initial position of the key point, a feature from a corresponding position of the second feature map; and
performing offset regression by using the feature to obtain the offset of the key point.

5. An electronic device, comprising:
one or more processors; and
a storage apparatus storing one or more programs thereon, the one or more programs, when executed by the one or more processors, causing the one or more processors to perform operations comprising:
extracting a first feature map and a second feature map of a to-be-positioned image, the first feature map and the second feature map being different feature maps;
determining, based on the first feature map, an initial position of a key point in the to-be-positioned image;
determining, based on the second feature map, an offset of the key point; and
adding the initial position of the key point with the offset of the key point to obtain a final position of the key point,
wherein the extracting the first feature map and the second feature map of the to-be-positioned image comprises:
inputting a to-be-positioned feature map into a main network to output an initial feature map of the to-be-positioned image; and
inputting the initial feature map into a first sub-network and a second sub-network respectively to output the first feature map and the second feature map, wherein the first sub-network and the second sub-network are two different branches of the main network.

6. The electronic device according to claim 5, wherein the determining, based on the first feature map, the initial position of the key point in the to-be-positioned image comprises:
generating, based on the first feature map, a heat map of the key point in the to-be-positioned image; and
determining, based on a heat value of a point on the heat map, the initial position of the key point.

7. The electronic device according to claim 6, wherein the generating, based on the first feature map, the heat map of the key point in the to-be-positioned image comprises:
performing 1×1 convolution on the first feature map to obtain the heat map, wherein channels of the heat map correspond to key points one to one.

8. The electronic device according to claim 5, wherein the determining, based on the second feature map, the offset of the key point comprises:
extracting, based on the initial position of the key point, a feature from a corresponding position of the second feature map; and
performing offset regression by using the feature to obtain the offset of the key point.

9. A non-transitory computer readable medium, storing a computer program thereon, the computer program, when executed by a processor, causing the processor to perform operations comprising:
extracting a first feature map and a second feature map of a to-be-positioned image, the first feature map and the second feature map being different feature maps;
determining, based on the first feature map, an initial position of a key point in the to-be-positioned image;
determining, based on the second feature map, an offset of the key point; and
adding the initial position of the key point with the offset of the key point to obtain a final position of the key point,
wherein the extracting the first feature map and the second feature map of the to-be-positioned image comprises:
inputting a to-be-positioned feature map into a main network to output an initial feature map of the to-be-positioned image; and
inputting the initial feature map into a first sub-network and a second sub-network respectively to output the first feature map and the second feature map, wherein the first sub-network and the second sub-network are two different branches of the main network.

10. The non-transitory computer readable medium according to claim 9, wherein the determining, based on the first feature map, the initial position of the key point in the to-be-positioned image comprises:
generating, based on the first feature map, a heat map of the key point in the to-be-positioned image; and
determining, based on a heat value of a point on the heat map, the initial position of the key point.

11. The non-transitory computer readable medium according to claim 10, wherein the generating, based on the first feature map, the heat map of the key point in the to-be-positioned image comprises:
performing 1×1 convolution on the first feature map to obtain the heat map, wherein channels of the heat map correspond to key points one to one.

12. The non-transitory computer readable medium according to claim 9, wherein the determining, based on the second feature map, the offset of the key point comprises:
 extracting, based on the initial position of the key point, a feature from a corresponding position of the second feature map; and
 performing offset regression by using the feature to obtain the offset of the key point.

\* \* \* \* \*